US011868420B2

(12) United States Patent
Banipal et al.

(10) Patent No.: US 11,868,420 B2
(45) Date of Patent: Jan. 9, 2024

(54) FACETED SEARCH THROUGH INTERACTIVE GRAPHICS

(71) Applicant: International Business Machines Corporation, Armonk, NY (US)

(72) Inventors: Indervir Singh Banipal, Austin, TX (US); Shikhar Kwatra, San Jose, CA (US); Nadiya Kochura, Bolton, MA (US); Sourav Mazumder, Contra Costa, CA (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 17/360,297

(22) Filed: Jun. 28, 2021

(65) Prior Publication Data

US 2022/0414174 A1    Dec. 29, 2022

(51) Int. Cl.
G06F 16/00 (2019.01)
*G06F 16/9538* (2019.01)
*G06F 16/9532* (2019.01)

(52) U.S. Cl.
CPC ...... *G06F 16/9538* (2019.01); *G06F 16/9532* (2019.01)

(58) Field of Classification Search
CPC ............. G06F 16/9538; G06F 16/9532; G06F 16/90332; G06F 16/90328
See application file for complete search history.

(56) References Cited

U.S. PATENT DOCUMENTS

| 7,761,464 | B2 | 7/2010 | Radlinski |
| 8,732,030 | B2 | 5/2014 | Gokturk |
| 8,977,618 | B2 | 3/2015 | Chen |
| 9,449,080 | B1 | 9/2016 | Zhang |
| 10,459,995 | B2 | 10/2019 | Lev-Tov |
| 10,699,161 | B2 | 6/2020 | Malur Srinivasan |
| 10,713,821 | B1 | 7/2020 | Surya |
| 11,481,387 | B2 * | 10/2022 | Yazdani ................ G06F 16/951 |
| 2007/0294225 | A1 | 12/2007 | Radlinski |
| 2012/0078955 | A1 * | 3/2012 | Boguraev ............. G06F 40/134 707/769 |
| 2017/0249674 | A1 | 8/2017 | Kerger |

(Continued)

OTHER PUBLICATIONS

Ak, "Deep learning approaches for attribute manipulation and text-to-image synthesis", A thesis submitted for the degree of doctor of philosophy, National University of Singapore, 2019, 124 pgs.

(Continued)

*Primary Examiner* — Jared M Bibbee
(74) *Attorney, Agent, or Firm* — Andre Adkins

(57) ABSTRACT

Disclosed are techniques for faceted search queries through interactive graphical objects. A text search query corresponding to a faceted search is received from a user, which is then parsed for keywords. Attributes associated with the keywords are then extracted and used to generate a graphical representation corresponding to the results associated with the text search query. Further user input to refine the query is provided through manipulation of the graphical representation by the user (such as dragging a leg of a table to change the length of legs on a table) corresponding to modification of one or more facets of the faceted search, narrowing the available search results corresponding to the faceted search.

18 Claims, 8 Drawing Sheets

(56) References Cited

U.S. PATENT DOCUMENTS

| | | | |
|---|---|---|---|
| 2018/0232449 A1* | 8/2018 | Bivens | G06F 16/285 |
| 2018/0232451 A1 | 8/2018 | Lev-Tov | |
| 2019/0114325 A1* | 4/2019 | Zaki | G06F 16/9535 |
| 2019/0244436 A1* | 8/2019 | Stansell | G06T 19/20 |
| 2019/0266442 A1 | 8/2019 | Malur Srinivasan | |
| 2020/0341976 A1* | 10/2020 | Aggarwal | G06Q 10/10 |
| 2020/0379958 A1* | 12/2020 | Riggs | G06F 16/2358 |
| 2021/0271818 A1* | 9/2021 | Sar Shalom | G06F 40/284 |

OTHER PUBLICATIONS

Jain, et al., "Text to Image Generation of Fashion Clothing." 2019 6th International Conference on Computing for Sustainable Global Development (INDIACom), 2019, 4 pgs., IEEE.

Krishnan. et al., "Large Scale Product Categorization using Structured and Unstructured Attributes", KDD '19: ACM SIGKDD Conference on Knowledge Discovery and Data Mining, Aug. 4-8, 2019, 9 pgs., arXiv:1903.04254v1 [cs.IR], Anchorage, Alaska. ACM, New York, NY, USA, <https://doi.org/10.1145/nnnnnnn.nnnnnnn>.

Logan, et al., "Multimodal Attribute Extraction", 31st Conference on Neural Information Processing Systems (NIPS 2017), Nov. 29, 2007, 7 pgs., arXiv:1711.11118v1 [cs.CL], Long Beach, CA, USA.

Qiao, et al., "Learn, Imagine and Create: Text-to-Image Generation from Prior Knowledge", 33rd Conference on Neural Information Processing Systems (NeurIPS 2019), 11 pgs., Vancouver, Canada.

Qiao, et al., "MirrorGAN: Learning Text-to-image Generation by Redescription", 2019 IEEE/CVF Conference on Computer Vision and Pattern Recognition (CVPR), 10 pgs., DOI 10.1109/CVPR.2019.00160, © 2019 IEEE, <https://ieeexplore.ieee.org/stamp/stamp.jsp?tp=&arnumber=8953553>.

Radford, et al., "Unsupervised representation learning with deep convolutional generative adversarial networks", Under review as a conference paper at ICLR 2016, Jan. 7, 2016, 16 pgs., arXiv:1511.06434v2 [cs.LG].

Reed, et al., "Generative adversarial text to image synthesis", Proceedings of the 33rd International Conference on Machine Learning, 2016, 10 pgs., New York, NY, USA.

Yang, et al., "Weakly-supervised disentangling with recurrent transformations for 3d view synthesis", Jan. 5, 2016, 11 pgs., arXiv:1601.00706v1 [cs.LG].

Zheng, et al., "OpenTag: Open Attribute Value Extraction from Product Profiles", KDD '18: The 24th ACM SIGKDD International Conference on Knowledge Discovery & Data Mining, Aug. 19-23, 2018, 10 pgs., arXiv:1806.01264v2 [cs.CL], London, United Kingdom, ACM, New York, NY, USA, <https://doi.org/10.1145/3219819.3219839>.

* cited by examiner

FACETED SEARCH THROUGH INTERACTIVE GRAPHICS

BACKGROUND

The present invention relates generally to the field of computer based search queries, and more particularly to search query inputs and result outputs.

A web search query is a type of query based on a specific search term that a user enters into a search engine (such as a web search engine) to satisfy their information needs. Web search queries are distinctive in that they are typically plain text or hypertext though may include optional search-directives (such as "and"/"or" with "-" to exclude).

Machine learning (ML) is the study of computer algorithms which automatically improve through experience. It is typically viewed as a subset of artificial intelligence (AI). Machine learning algorithms typically construct a mathematical model based on sample data, sometimes known as "training data", in order to determine predictions or decisions without being specifically programmed to do so.

A generative adversarial network (GAN) is a class of machine learning frameworks. In a GAN, two neural networks (a generator and a discriminator) contest with each other in a game (in the form of a zero-sum game, where one agent's gain is another agent's loss). When provided a training set, this technique learns to generate new data with the same statistics as the training set. For example, a GAN trained on photographs can create new photographs that look at least superficially authentic to human observers, having many realistic-appearing characteristics. Though GANs were originally proposed as a form of generative model for unsupervised learning, they have also proven useful in semi-supervised learning, fully supervised learning, and reinforcement learning settings. A cornerstone idea of a GAN is based on the "indirect" training through the discriminator, which is also updated dynamically. This means that the generator is not trained to minimize the distance to a specific image, but rather to fool the discriminator. This enables the model to learn in an unsupervised manner.

Natural language processing (NLP) is a subfield of linguistics, computer science, and artificial intelligence describing the interactions between computers and human language and how to program computers to process and analyze large amounts of natural language data. The intended result is a computer capable of "understanding" the contents of documents, including the contextual nuances of the language within them. The technology can then apply this understanding to accurately extract information and insights contained in the documents as well as categorize and organize the documents themselves.

Faceted search is a technique for augmenting traditional search techniques with a faceted navigation system that allows users to narrow down search results by applying multiple filters based on faceted classification of the items. A faceted classification system typically classifies each information element along multiple explicit dimensions, referred to as facets, enabling the classifications to be accessed and ordered in multiple ways rather than in a single, pre-determined, taxonomic order.

SUMMARY

According to an aspect of the present invention, there is a method, computer program product and/or system that performs the following operations (not necessarily in the following order): (i) receiving a text-based query corresponding to a faceted search; (ii) parsing out at least one keyword(s) from the text-based query; (iii) determining a set of attributes corresponding to the at least one keyword(s); and (iv) generating a graphical representation corresponding to the at least one keyword(s) illustrating at least one attribute of the set of attributes.

DETAILED DESCRIPTION

Figure 1:
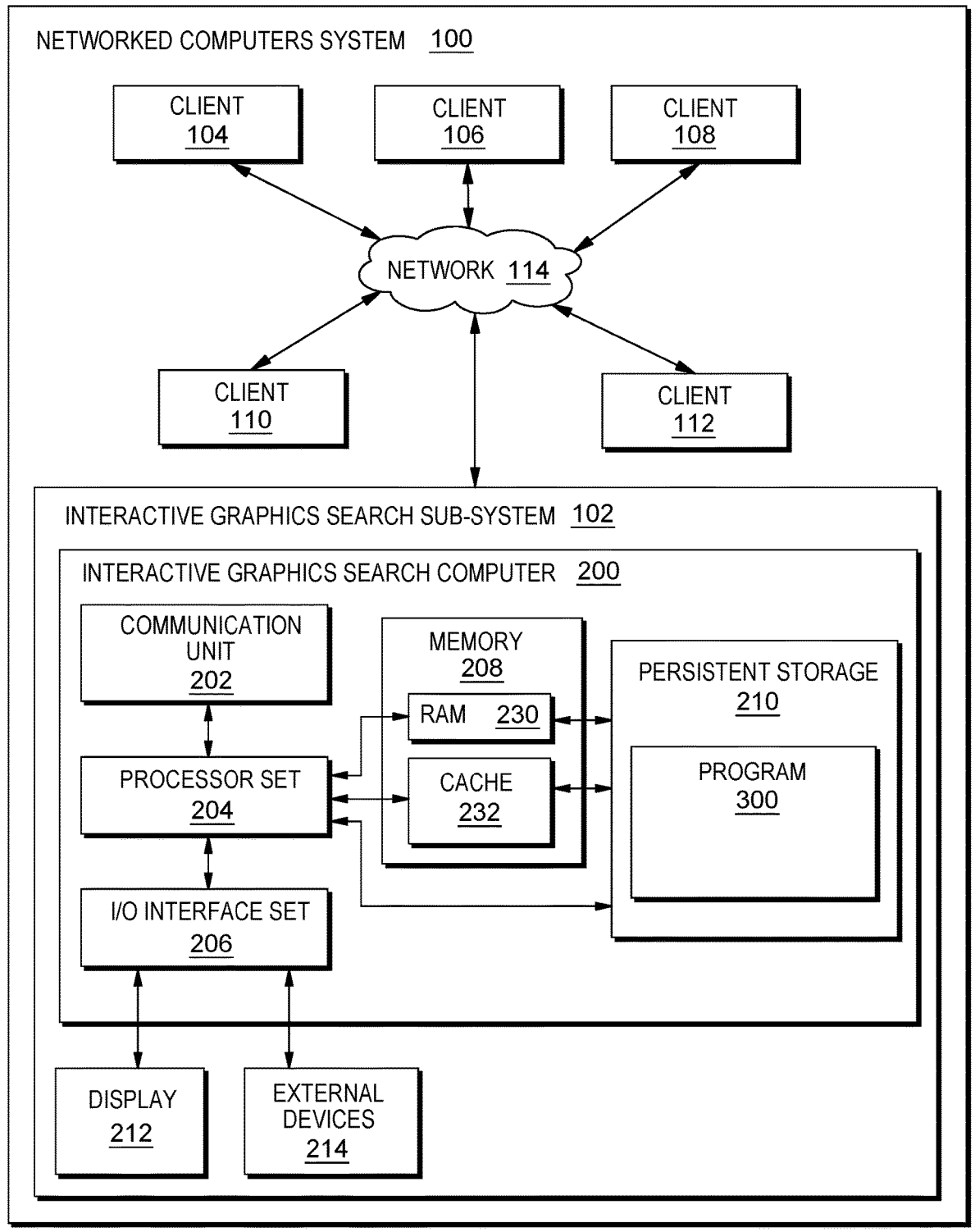
FIG. 1 is a block diagram view of a first embodiment of a system according to the present invention.

Some embodiments of the present invention are directed to techniques for faceted search queries through interactive graphical objects. A text search query corresponding to a faceted search is received from a user, which is then parsed for keywords. Attributes associated with the keywords are then extracted and used to generate a graphical representation corresponding to the results associated with the text search query. Further user input to refine the query is provided through manipulation of the graphical representation by the user (such as dragging a leg of a table to change the length of legs on a table) corresponding to modification of one or more facets of the faceted search, narrowing the available search results corresponding to the faceted search.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium sometimes referred to as a machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device(s) 214. External device(s) 214 will typically include devices such as a keyboard, keypad, a touch screen, and/or some other suitable input device. External device(s) 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
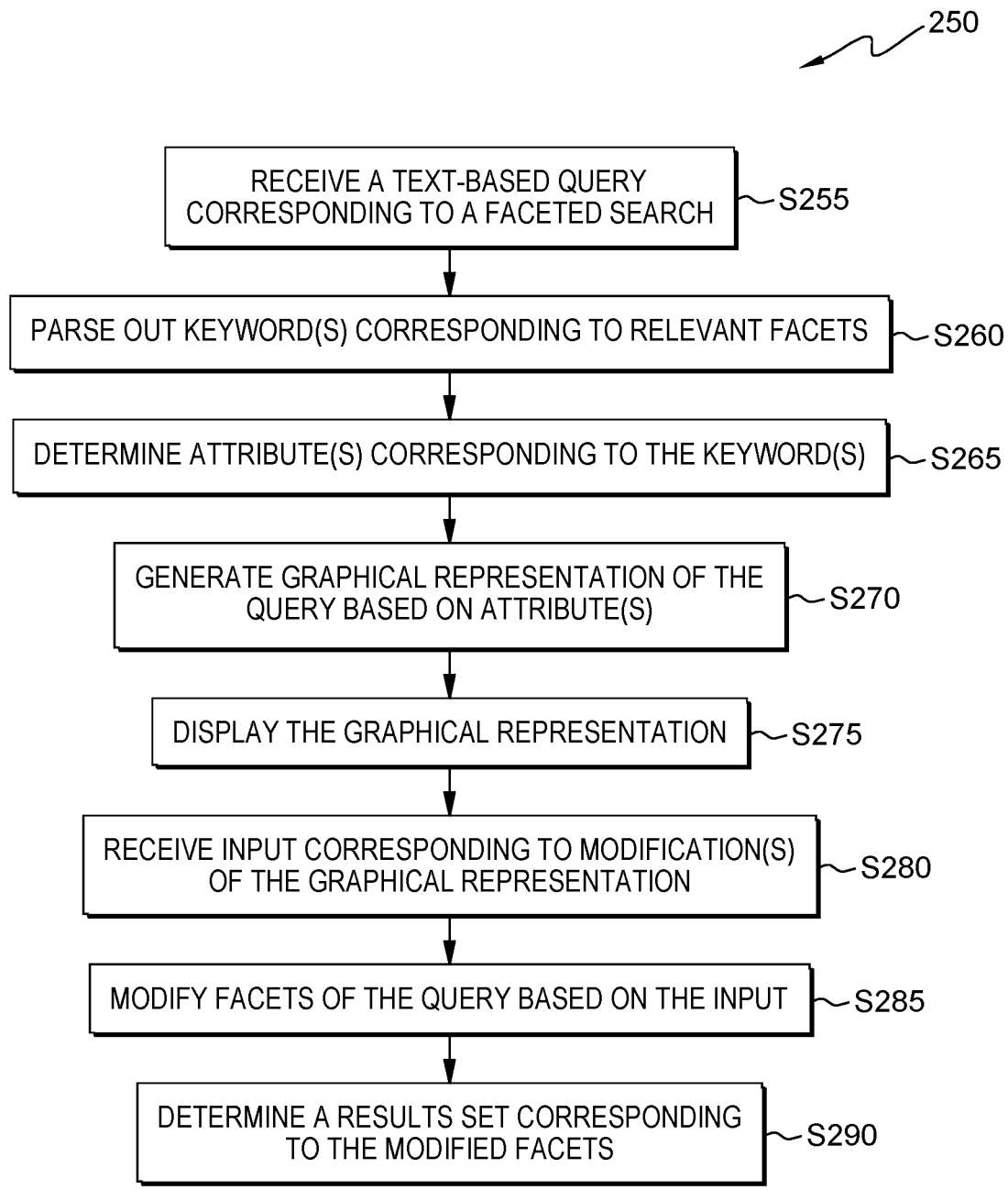
FIG. 2 is a flowchart showing a first embodiment method performed, at least in part, by the first embodiment system.
Figure 3:
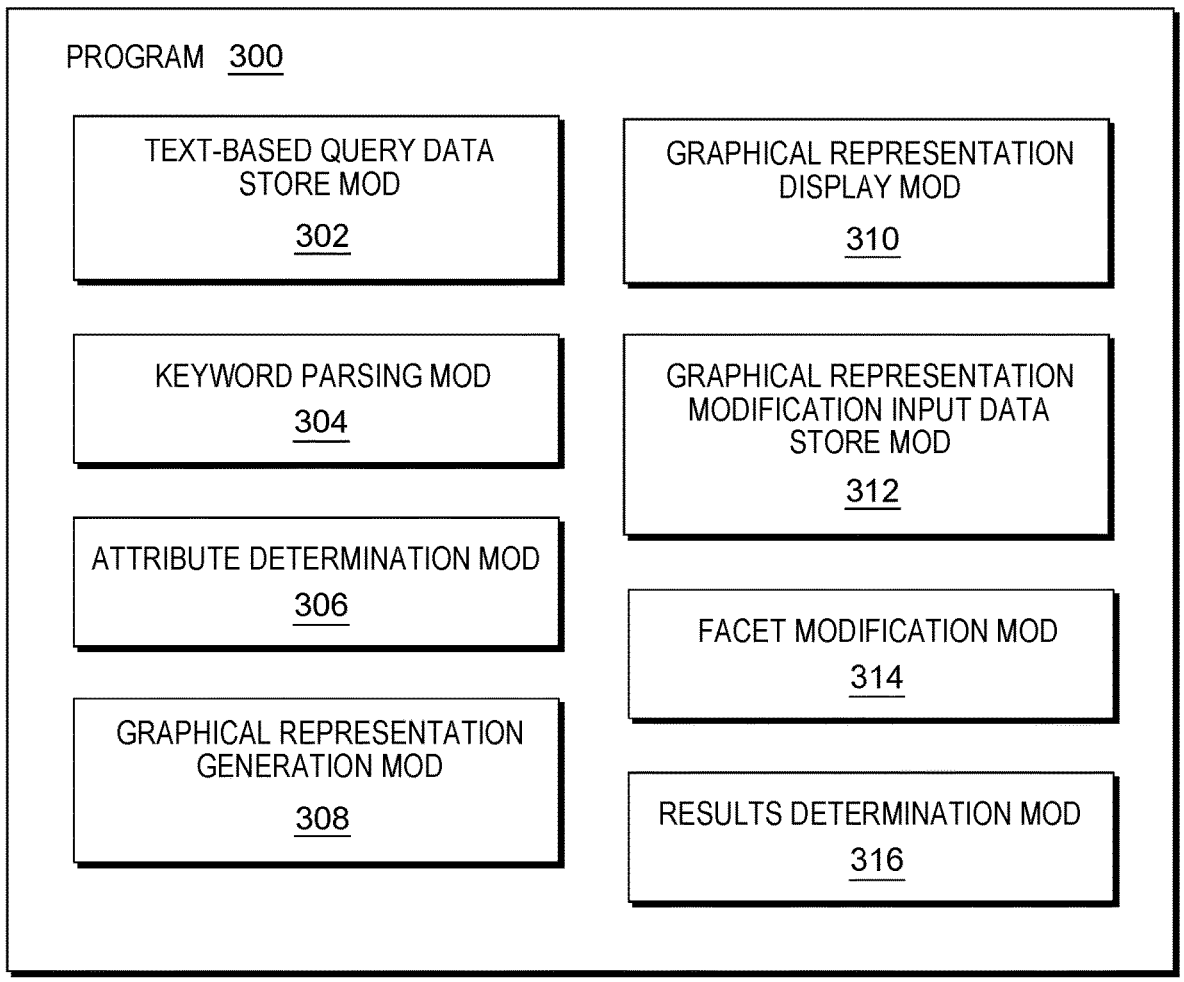
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where text-based query data store module ("mod") 302 receives a text-based query corresponding to a faceted search. In this simplified example embodiment, the text-based query, provided from a user through client 104 of FIG. 1, comprises the phrase "four sided table," which is provided by a user into a web-based search platform, which includes faceted search functionality, to search for furniture tables with four sides. In some alternative embodiments of the present invention, subject suitable for a faceted query is suitable for use instead of the furniture-table example of the simplified example embodiment. For example, airplane flight destinations and departure/arrival times, vehicles, residences, rental accommodations, etc.

Processing proceeds to operation S260, where keyword parsing mod 304 parses out keyword(s) corresponding to relevant facets. In this simplified embodiment, conventional natural language processing (NLP) techniques are applied to parse out relevant keywords from the text-based query stored in text-based query data store mod 302. Key phrases, or combinations of two or more words, are also parsed out where appropriate, and will be referred to simply as keywords as well. As in this simplified embodiment, keyword parsing mod 304, using NLP, parses out two keywords from the text-based query stored in text-based query data store mod 302: (i) "table" and (ii) "four sided." Keyword parsing mod 304, again using NLP, determines relevant facets for the keywords from the keywords themselves, determining that "four sided" and "table" typically correspond to furniture and that a table is a type of furniture, where a four sided table is a sub-type of table, and a table is a sub-type of furniture. Keyword parsing mod 304, again using NLP, determines that relevant facets present in the text-based query are: (i) furniture; (ii) tables, a sub-type of furniture; and (iii) four-sided [tables], a sub-type of tables.

Processing proceeds to operation S265, where attribute determination mod 306 determines attribute(s) corresponding to the keyword(s). In this simplified embodiment, attribute determination mod 306 determines attribute(s) corresponding to the keyword(s) by applying NLP techniques to determine descriptions most associated with the keyword(s), with the complete list of keywords extracted from the text-based query used as context. Some example descriptions in the simplified embodiment include: (i) wood; (ii) brown; and (iii) large. In this simplified embodiment, the NLP techniques used to determine descriptions includes using neural word embeddings on the text-based query. In some alternative embodiments, the neural word embeddings are used as input into a machine learning model based on a bidirectional long short term memory network architecture to identify long range dependencies between the parsed keywords.

Processing proceeds to operation S270, where graphical representation generation mod 308 generates a graphical representation of the query based on the attribute(s). In this simplified embodiment, graphical representation generation mod 308 encompasses a generative adversarial network (GAN) tasked with rendering three-dimensional objects matching a set of descriptive terms trained using sets of images paired with descriptive text describing attributes in each image. This GAN is then provided the attributes determined at S265 as the basis for generating a three-dimensional object matching the attributes. In this simplified embodiment, graphical representation generation mod 308 generates a table with four legs, consistent with the keyword(s) previously parsed from the text-based query.

In some alternative embodiments, other GANs tasked with different inputs and outputs are used to generate graphical representations appropriate with the relevant query subjects. In yet further alternative embodiments, separate graphical representations are generated (and subsequently displayed, as discussed in detail further below) for each attribute or keyword associated with a text-based query. One advantage of these alternative embodiments is to enable graphical interaction with a text based query one facet at a time. For example, changing the shape of one part of an object without altering other parts of the object. In some of these alternative embodiments, these separate graphical representations are shown adjacent to each other on a display. In yet further alternative embodiments, where attributes or keywords correspond to a large variety of potential results, graphical representations representative of each type of result are generated. For example, if the text-based query was "table," a set of tables of different shapes (round, square, triangle, rectangle, hexagonal, etc.) are generated and subsequently displayed (as described below in greater detail).

Figure 4A:
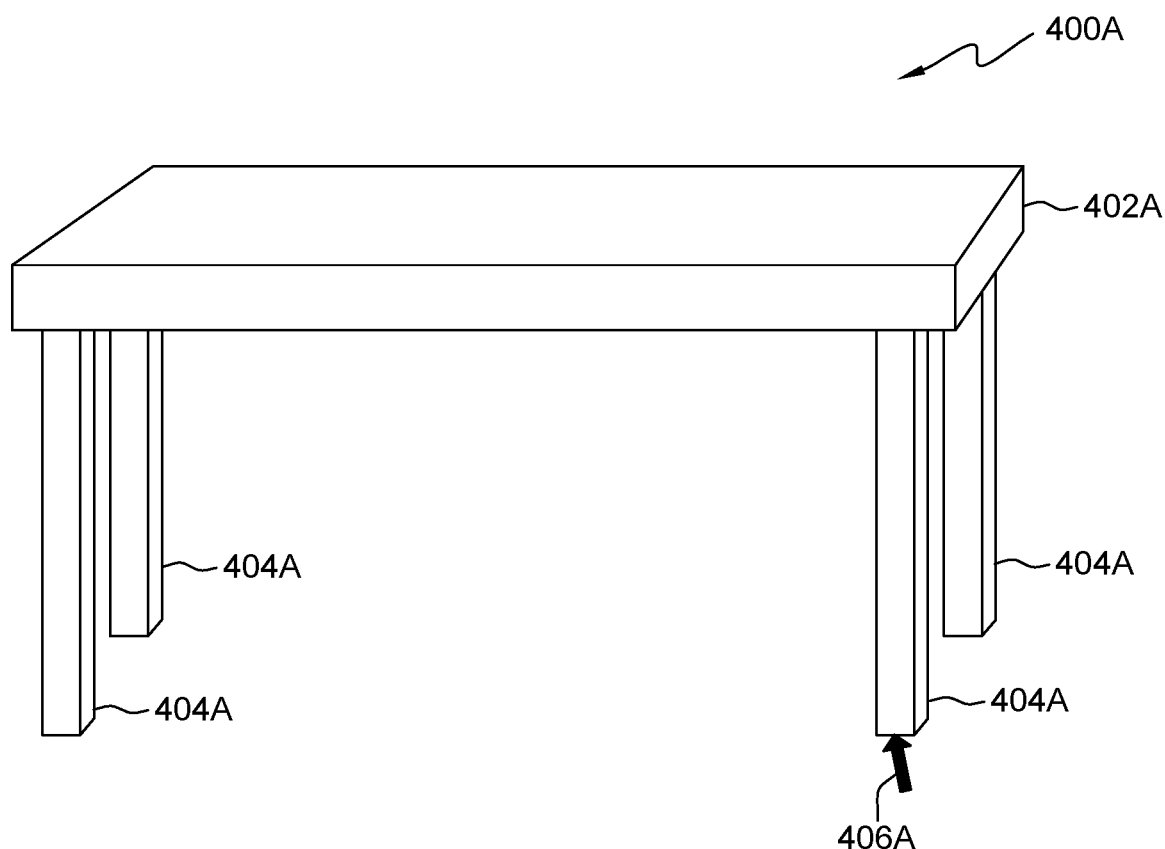
FIG. 4A is a screenshot view generated by the first embodiment system.

Processing proceeds to operation S275, where graphical representation display mod 310 displays the graphical representation. In this simplified embodiment, the graphical representation is shown in screenshot 400A of FIG. 4A, including surface 402A, and legs 404A. A cursor is also displayed for interaction with the graphical representation, shown as cursor 406A.

Figure 4B:
FIG. 4B is a screenshot view generated by the first embodiment system.

Processing proceeds to operation S280, where graphical representation modification input data store mod 312 receives input corresponding to modification of the graphical representation. In this simplified embodiment, the input comprises cursor 406A dragging one of the legs shown as legs 404A to a shorter length, lowering the overall height of the table shown in the graphical representation, resulting in screenshot 400B of FIG. 4B, which includes: (i) surface 402B (unchanged from screenshot 400A of FIG. 4A); (ii) legs 404B (now much shorter than legs 404A); and cursor 406B.

Processing proceeds to operation S285, where facet modification mod 314 modifies facets of the query based on the input. In this simplified embodiment, facet modification mod 314 modifies the facets (previously determined as: (i) furniture; (ii) tables, a sub-type of furniture; and (iii) four-sided [tables], a sub-type of tables) using a second GAN to determine attributes of the graphical representation modified by the input, determines a set of facets from those attributes that apply to the graphical representation modified by the input. In this simplified example embodiment, the second GAN determines an attribute of "coffee table" from the now shorter table shown in the graphical representation. A new set of facets is determined based on these attributes: (i) furniture; (ii) tables, a sub-type of furniture; (iii) coffee table, a sub-type of tables; and (iv) four-sided [coffee tables], a sub-type of coffee tables). The new facet, coffee table, is determined to have a relative taxonomic position higher than four-sided table, and is subsequently inserted above four-sided in the set of facets. In some alternative embodiments, further input steps such as S280 are applied further modifying the graphical representation and resulting in additional (or different) facets. Each subsequent modification can be (at least temporarily) 'locked in' and used to proceed down a hierarchical facet taxonomy to narrow down potential search results, before ultimately presenting a set of search results closely corresponding with the graphical representation.

Processing proceeds to operation S290, where results determination mod 316 determines a results set corresponding to the modified facets. In this simplified embodiment, query results matching four sided coffee tables are returned based on matching each of the facets: (i) furniture; (ii) tables, a sub-type of furniture; (iii) coffee table, a sub-type of tables; and (iv) four-sided [coffee tables], a sub-type of coffee tables). In some alternative embodiments, where there are no results that match all of the facets, facets are assigned a priority value and results are shown that match all but the lowest priority facet (for example, in the simplified embodiment, four-sided is assigned the lowest priority value due to its relative location in a taxonomic hierarchy.) An advantage to some embodiments of the present invention is a way to refine search queries in a visually interactive manner; instead of (or as an alternative to) changing numbers or typing in terms to modify a query, a user can modify elements of a graphical representation of their query to affect changes to the underlying query (and subsequently returned results thereof).

III. Further Comments and/or Embodiments

Some embodiments of the present invention recognize the following facts, potential problems and/or potential areas for improvement with respect to the current state of the art: (i) while looking for any product on an e-commerce website, people usually search via keywords and get a list of matching search results; (ii) the list typically consists of hyperlinked titles, with some text description; (iii) people click on the hyper-link to look for the detailed verbose description; and (iv) reading the text takes a lot of time and effort to understand the specifications of a job.

Some embodiments of the present invention may include one, or more, of the following operations, features, characteristics and/or advantages: (i) a system and associated methods to show a pictorial view of the product that can convey the job's essence in a shorter time while grabbing more attention; (ii) the pictorial representation of a product would contain: (a) keywords tagged to the product, (b) graphical organization structure and where the product lies in the taxonomy (c) graphical representation of the level where the product lies in the taxonomy hierarchy, (d) attributes of the product which can be visually described, (e) pictorial representation of the attributes of the product which can be: (1) tweaked to change the behavior, and (2) that behavior can act as the actual filter for further delving down to the right taxonomy of the product, and (f) domain specific attributes and graph of the similar products attached.

Some embodiments of the present invention may include one, or more, of the following operations, features, characteristics and/or advantages: (i) while looking for any product on e-commerce/flights website, people usually search via keywords and get a list of matching search results; (ii) extract the attributes of the keywords associated with the product and get the corresponding pictorial representation of it; (iii) pictorial representation which is editable by tweaking certain configurable components; (iv) if the image of the attribute does not exist, similar images are generated using: (a) text to image conversion, (b) GAN driven generation of the pictorial representation of the attribute or component, and (c) hypothesis testing to check whether the component can act as filter or not; (v) the system lets the user play with the pictorial rep of the product attribute to: (a) perform a faceted search, and (b) move to the next level of the search through search tree; (vi) after the process is complete, let the system improve itself through: (a) reinforcement mechanism, and (b) federated learning; (vii) halo affect on pictorial rep having user preferred search results.

Some embodiments of the present invention may include one, or more, of the following operations, features, characteristics and/or advantages: (i) system and method for generating additional filters based on personalization of keywords; (ii) system and method for optimal conversion of text based filters to GAN based interactive media generated audio/video/image; (iii) dynamic facets transformation from text custom tailored for different users using Time-series GANs; (iv) relative positioning module showing where the product lies in the taxonomy's hierarchy and structure; (v) learning module that is primarily driven by GAN and RL; (vi) a user will be shown a few pictorial aspects that can be changed/tweaked which will help in acting as filters; (vii) time varying image generation scheduler based on personalization; and (viii) the pictorial representations are made using: (a) text description to image synthesis techniques such as GANs or Attention GANs, (b) cached and tagged images that the system has in its picture database, (c) pre-programed modules to render standard components of product description with key aspects being customizable, including: (1) relative positioning module showing where the product lies in the taxonomy's hierarchy and structure, and (2) learning module primarily driven by GAN and RL, (d) a user will be shown a few pictorial aspects that can be changed/tweaked which will help in acting as filters, and (e) as the search progresses, the system attaches more and more of the following to help in the search: (1) pictorial attributes which can be tweaked to refine the search, (2) RL driven feedback-based recommendation of better pictorial representations based on the product, and (3) a pyramid with hierarchy of product's pictorial attributes in the taxonomy rendered using the Relative Positioning module.

Some embodiments of the present invention may include one, or more, of the following operations, features, characteristics and/or advantages: (i) methods to further refine the search through interactive GAN generated images include the following example: (a) a generator network of GAN generated images showing a clock which shows the timings being 9-5 during a flight search, and (b) the user can use the generated images to tweak the clock handles to further search for flights which have the timings from 10-4; (ii) method for dynamic generation of faceted search includes the following example: (a) not all the images will have features which can be tweaked to refine the search, (b) hypothesis testing enabled components selection will enable the GAN generated image to act as a filter or a non-filter (just a static image), (c) for example, if the salary is mentioned only for 5% of the total jobs available, in that case it won't be included in the list of GAN generated images which have dynamic faceted filtering option.

Some embodiments of the present invention may include one, or more, of the following operations, features, characteristics and/or advantages: (i) improving searchability with generated images based on complimentary attributes deducted from the inventory products description; (ii) for example, a user is looking for "accent" piece of furniture, such as red table; (ii) the user is not sure about other table attributes for the search inquiry; (iii) the user enters "red table" query; (iv) system processes the description of the available tables and identifies complimentary attributes; (v) utilizing GAN, system generates and presents to the user hierarchical view of various styles and then types as the (a) console, (b) center, (c) side, (d) rectangle, (e) square, (f) round, and (g) four legs . . . tables; (v) in another example, GAN generates images for flight timings; (vi) hypothesis testing to check if there is significant evidence of the feature being present in most of the job descriptions; (vii) system to make the GAN generated image as: (a) Interactive, and (b) be able to be used as a dynamic search facet; (viii) user preference based Halo affect on the GAN generated images: (a) lets say a user has been searching for a flight in a certain time range, (b) the user comes across various flights according to their search criteria, (c) most of those results/jobs have the timings listed as 9-5 PM, (d) the user has also been searching for 10-4 PM in the past as well, (e) enhance the search results through preference based Halo affect on the GAN generated image facets which suit the past criteria, (f) the user may want a time varying image generation aspect wherein Based on time, GAN's generator is able to synthesize new images, (g) for that, the model is scheduled (using, for example, CLI travis job) to automate the features being fed into the generator and pixels are perturbed with varying images at different delta variations in time.

Some embodiments of the present invention may include one, or more, of the following operations, features, characteristics and/or advantages: (i) individual modules to render various components, (ii) text to image module to create any customized domain specific images, (iii) database to store customized tags and tags to image mapping; (iv) enables the generation of a pictorial view based on the product search which can help in filtering down to the right product; (v) the pictorial representation is achieved by GAN/ML based algorithm based on the keywords and product description; (vi) GAN generated product attributes can be configured by the user to delve down to the arrive at the right product; (vii) achieves all the functions of faceted search through this; (viii) the process takes in a feedback loop enabled by Reinforcement Learning and Federated Learning; (ix) the user does not need to know the language in which the travel/e-commerce/etc. website is written to perform the faceted search to arrive at the target product to be bought; (x) or to select the travel times and from/to destinations in the case of travel websites; (xi) for example, if a user is stuck in a country where the user does not know the language of the place, they can perform the faceted search through the pictorial representations of the products and its attributes, whose generation is enabled with GAN/ML methods; (xii) where faceted search can be enabled by GAN generated product pictures and attributes; and (xiii) generates faceted search capabilities for any of the online service platforms such as e-commerce/travel/etc.

Some embodiments of the present invention may include one, or more, of the following operations, features, characteristics and/or advantages: (i) system and method for generating additional filters based on personalization of keywords; (ii) system and method for optimal conversion of text based filters to GAN based interactive media generated audio/video/image; (iii) dynamic facets transformation from text custom tailored for different users using Time-series GANs; (iv) the pictorial representations would be made using text description to image synthesis techniques such as GANs or Attention GANs; (v) cached and tagged images that the system has in its picture database; (vi) pre-programed modules to render standard components of product description with key aspects being customizable; (vii) relative positioning module shows where the product lies in the taxonomy's hierarchy and structure; (viii) learning module: primarily driven by GAN and RL; (ix) the user will be shown a few pictorial aspects that can be changed/tweaked which will help in acting as filters; and (x) as the search progresses, the system attaches more and more of the following to help in the search: (a) pictorial attributes which can be tweaked to refine the search RL driven feedback-based recommendation of better pictorial representations based on the product, and (b) a pyramid with hierarchy of product's pictorial attributes in the taxonomy rendered using Relative Positioning module.

Figure 5:
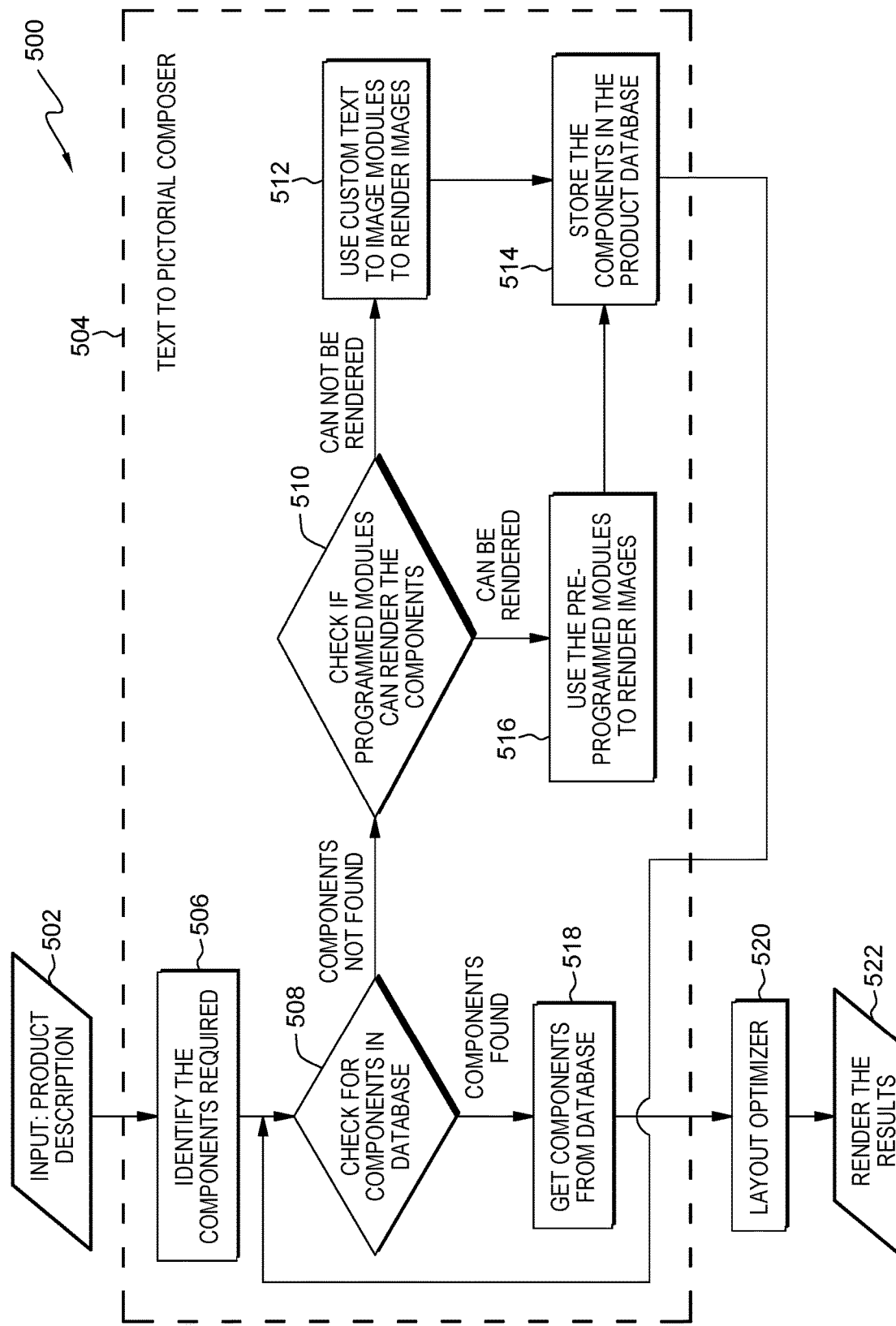
FIG. 5 is a flowchart showing a second embodiment method.

Flowchart 500 of FIG. 5 shows a computer implemented method according to a second embodiment of the present invention, including: (i) beginning input step 502; (ii) text to pictorial composer 504; (iii) identify step 506; (iv) database components decision step 508; (v) render components decision step 510; (vi) text to image step 512; (vii) components storage step 514; (viii) pre-programmed modules rendering step 516; (ix) components retrieval step 518; (x) layout optimizer step 520; and (xi) end render step 522. At decision step 508, when checking a database for components identified at step 506, if the components are not found in the database, the method proceeds to step 510, or to step 518 if the components are found in the database. At decision step 510, when checking if pre-programmed modules can render the components, if the pre-programmed modules cannot render the components, proceed to step 512, or to step 516 if the pre-programmed modules can render the components. After step 514, return to step 508, where the components are now found in the database.

Figure 6:
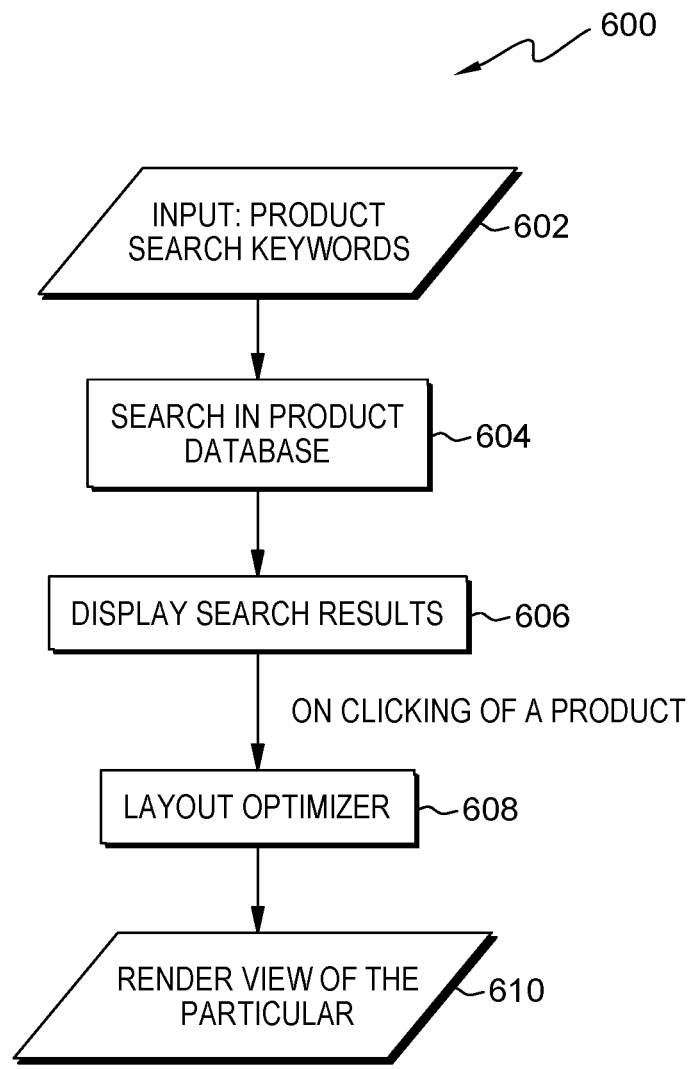
FIG. 6 is a flowchart showing a user perspective of the second embodiment method.

Flowchart 600 of FIG. 6 shows a user perspective computer implemented method according to the second embodiment of the present invention, including: (i) start step 602; (ii) step 604; (iii) step 606; (iv) step 608; and (v) end step 610.

Figure 7:
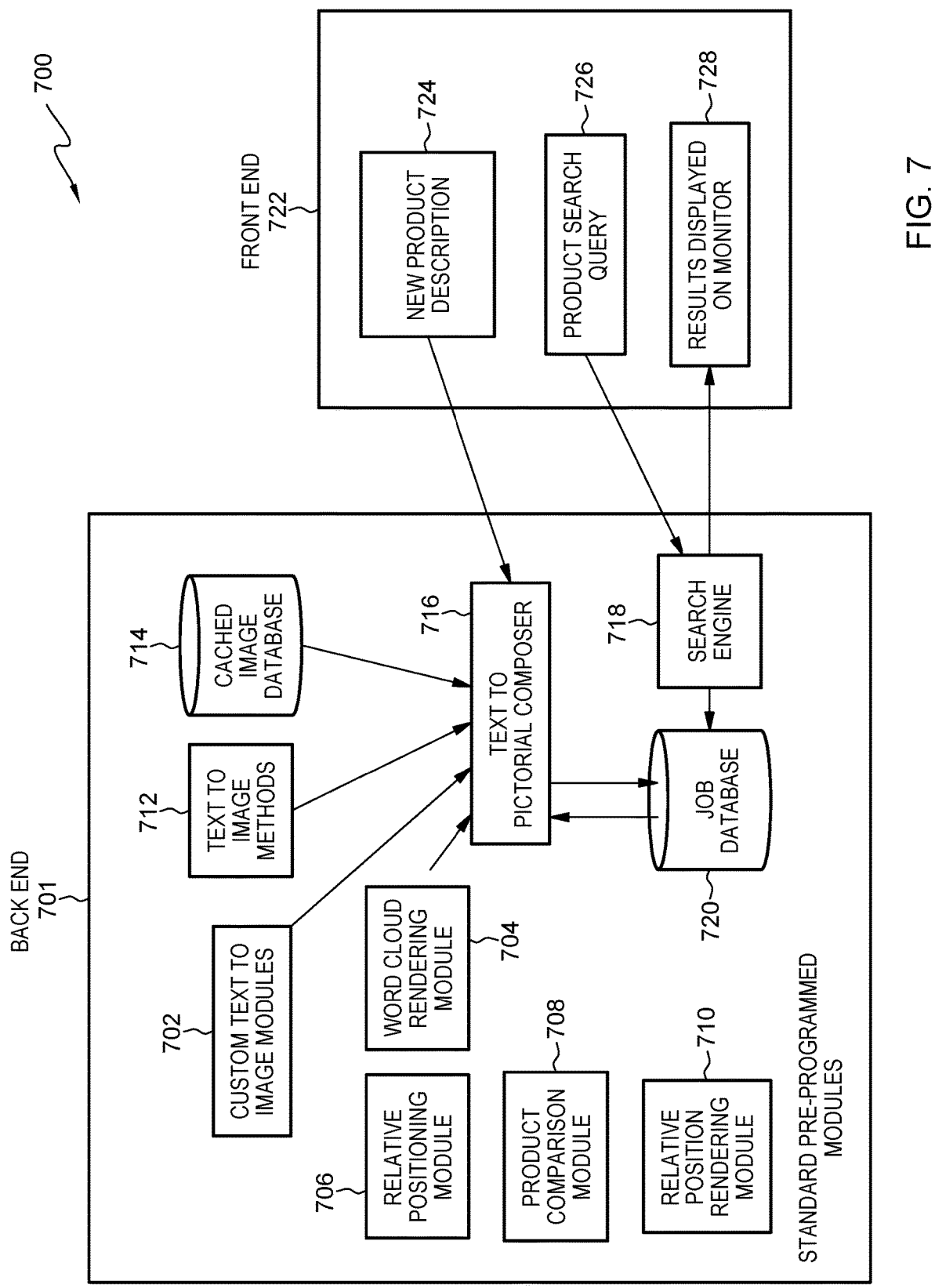
FIG. 7 is a block diagram view of a second embodiment system for performing the second embodiment method.

Block diagram 700 of FIG. 7 shows a system level architecture according to the second embodiment of the present invention, including: (i) back end system 701; (ii) custom text to image modules 702; (iii) word cloud rendering module 704; (iv) relative positioning module 706; (v) product comparison module 708; (vi) relative positioning rendering module 710; (vii) text to image methods 712; (viii) cached image database 714; (ix) text to pictorial composer 716; (x) search engine 718; (xi) job database 720; (xii) front end system 722; (xiii) new product description 724; (xiv) product search query 726; and (xv) results displayed on monitor 728.

Figure 8:
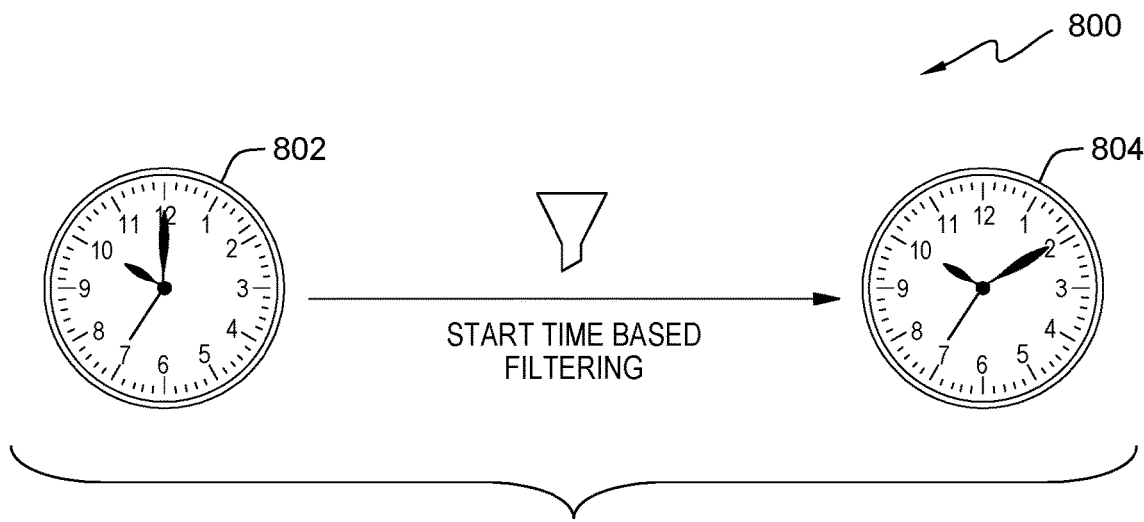
FIG. 8 is a screenshot view generated by the second embodiment system.

Screenshot 800 of FIG. 8 shows images for faceted filtering generated by the system using a GAN according to the second embodiment of the present invention, including: (i) image 802; and (ii) image 804.

Figure 9:
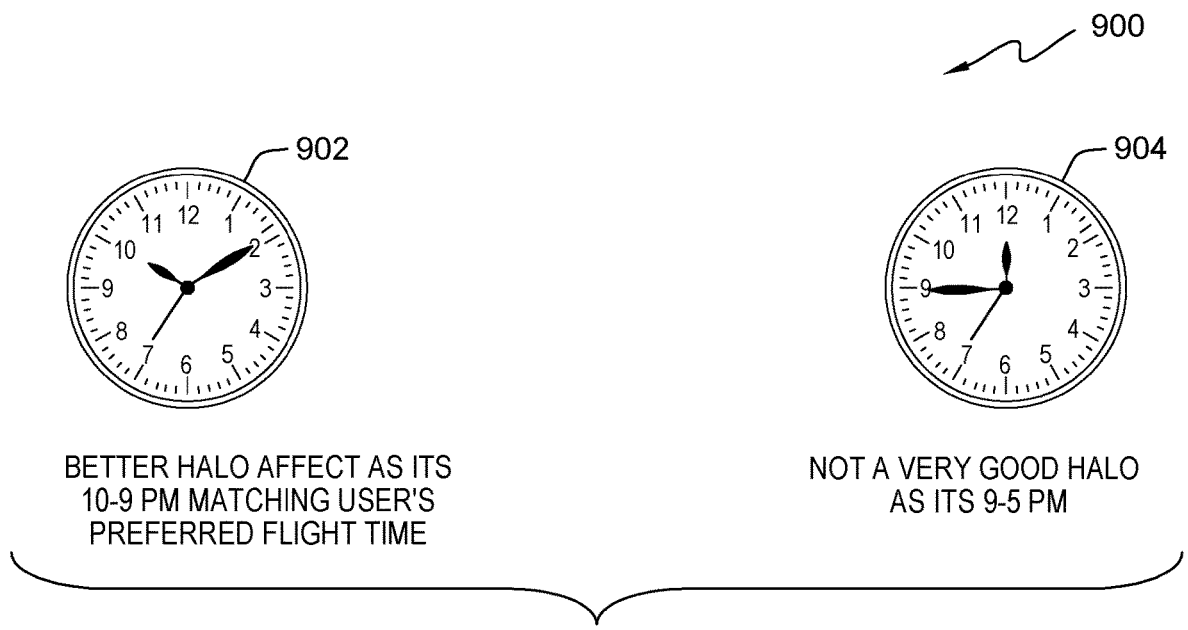
FIG. 9 is a screenshot view generated by the second embodiment system.

Screenshot 900 of FIG. 9 shows filtering using images generated by the system according to the second embodiment of the present invention, including: (i) image 902; and (ii) image 904.

Some embodiments of the present invention comprise a method including some or all of the following steps (not necessarily in the following order): (i) receiving a textual search query for a desired product; (ii) identifying attributes/keywords/components associated with the desired product; (iii) generating, using a Generative adversarial network (GAN), an animation of the attributes of the desired product; (iv) outputting the animation and enabling a user to modify attributes of the animation to refine their search query, in which modifying the attributes is equivalent to changing filters of the textual search query. The method above, further comprising: wherein the animation is at least one of an audio, video, and an image representation. The method above, further comprising: the animation includes keywords tagged to the desired product, a graphical organization structure of where the desired product lies in a taxonomy. The method above, further comprising: the graphical organization structure is generated using a relative positioning module.

Some embodiments of the present invention may include one, or more, of the following operations, features, characteristics and/or advantages: (i) after the product animation is generated based on the user query (for eg. an animation of "wooden table" is generated using GAN and presented to the user), the user can view the animation; (ii) the user can play around with the attribute of the animation (eg., attribute='color'); (iii) for example, the user selects color=silver; (iv) the query detects this change in the animation and builds a more specific query (with color=silver); (v) the query then narrows down to show the table results which have a silver color; and (vi) this recursive process keeps happening (enabled through a GAN) until the user arrives at the target product.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

We: this document may use the word "we," and this should be generally be understood, in most instances, as a pronoun style usage representing "machine logic of a computer system," or the like; for example, "we processed the data" should be understood, unless context indicates otherwise, as "machine logic of a computer system processed the data"; unless context affirmatively indicates otherwise, "we," as used herein, is typically not a reference to any specific human individuals or, indeed, and human individuals at all (but rather a computer system).

What is claimed is:

1. A computer-implemented method (CIM) comprising:
   receiving a text-based query corresponding to a faceted search;
   parsing out at least one keyword(s) from the text-based query;
   determining a set of attributes corresponding to the at least one keyword(s) via a machine learning model; and
   generating a graphical representation corresponding to the at least one keyword(s) illustrating at least one attribute of the set of attributes;
   wherein the machine learning model generates the graphical representation simultaneously synthesizing the set of attributes.

2. The CIM of claim 1, further comprising:
   displaying the generated graphical representation on an electronic display of a computer device.

3. The CIM of claim 2, further comprising:
   receiving input corresponding to interaction(s) with the displayed graphical representation; and
   modifying the displayed graphical representation based, at least in part, on the input.

4. The CIM of claim 3, further comprising:
   modifying at least one facet(s) of the faceted search based, at least in part, on the modified di splayed graphical representation.

5. The CIM of claim 1, wherein the graphical representation further includes a taxonomy structure illustrative of where the graphical representation resides in a hierarchal taxonomy of subjects corresponding to the faceted search.

6. The CIM of claim 1, wherein the machine learning model is a generative adversarial network (GAN) designed to render three-dimensional objects matching the at least one keyword(s) trained using a plurality of images.

7. A computer program product (CPP) comprising:
   a machine readable storage device; and
   computer code stored on the machine readable storage device, with the computer code including instructions for causing a processor(s) set to perform operations including the following:
   receiving a text-based query corresponding to a faceted search,
   parsing out at least one keyword(s) from the text-based query,
   determining a set of attributes corresponding to the at least one keyword(s) via a machine learning model, and
   generating a graphical representation corresponding to the at least one keyword(s) illustrating at least one attribute of the set of attributes;

wherein the machine learning model generates the graphical representation simultaneously synthesizing the set of attributes.

8. The CPP of claim 7, wherein the computer code further includes instructions for causing the processor(s) set to perform the following operations:
   displaying the generated graphical representation on an electronic display of a computer device.

9. The CPP of claim 8, wherein the computer code further includes instructions for causing the processor(s) set to perform the following operations:
   receiving input corresponding to interaction(s) with the displayed graphical representation; and
   modifying the displayed graphical representation based, at least in part, on the input.

10. The CPP of claim 9, wherein the computer code further includes instructions for causing the processor(s) set to perform the following operations:
    modifying at least one facet(s) of the faceted search based, at least in part, on the modified di splayed graphical representation.

11. The CPP of claim 7, wherein the graphical representation further includes a taxonomy structure illustrative of where the graphical representation resides in a hierarchal taxonomy of subjects corresponding to the faceted search.

12. The CPP of claim 7, wherein the machine learning model is a generative adversarial network (GAN) designed to render three-dimensional objects matching the at least one keyword(s) trained using a plurality of images.

13. A computer system (CS) comprising:
    a processor(s) set;
    a machine readable storage device; and
    computer code stored on the machine readable storage device, with the computer code including instructions for causing the processor(s) set to perform operations including the following:
       receiving a text-based query corresponding to a faceted search,
       parsing out at least one keyword(s) from the text-based query,
       determining a set of attributes corresponding to the at least one keyword(s) via a machine learning model, and
       generating a graphical representation corresponding to the at least one keyword(s) illustrating at least one attribute of the set of attributes;
       wherein the machine learning model generates the graphical representation simultaneously synthesizing the set of attributes.

14. The CS of claim 13, wherein the computer code further includes instructions for causing the processor(s) set to perform the following operations:
    displaying the generated graphical representation on an electronic display of a computer device.

15. The CS of claim 14, wherein the computer code further includes instructions for causing the processor(s) set to perform the following operations:
    receiving input corresponding to interaction(s) with the displayed graphical representation; and
    modifying the displayed graphical representation based, at least in part, on the input.

16. The CS of claim 15, wherein the computer code further includes instructions for causing the processor(s) set to perform the following operations:
    modifying at least one facet(s) of the faceted search based, at least in part, on the modified di splayed graphical representation.

17. The CS of claim 15, wherein the computer code further includes instructions for causing the processor(s) set to perform the following operations:
    modifying at least one facet(s) of the faceted search based, at least in part, on the modified di splayed graphical representation.

18. The CS of claim 13, wherein the machine learning model is a generative adversarial network (GAN) designed to render three-dimensional objects matching the at least one keyword(s) trained using a plurality of images.

* * * * *